United States Patent Office 3,448,024
Patented June 3, 1969

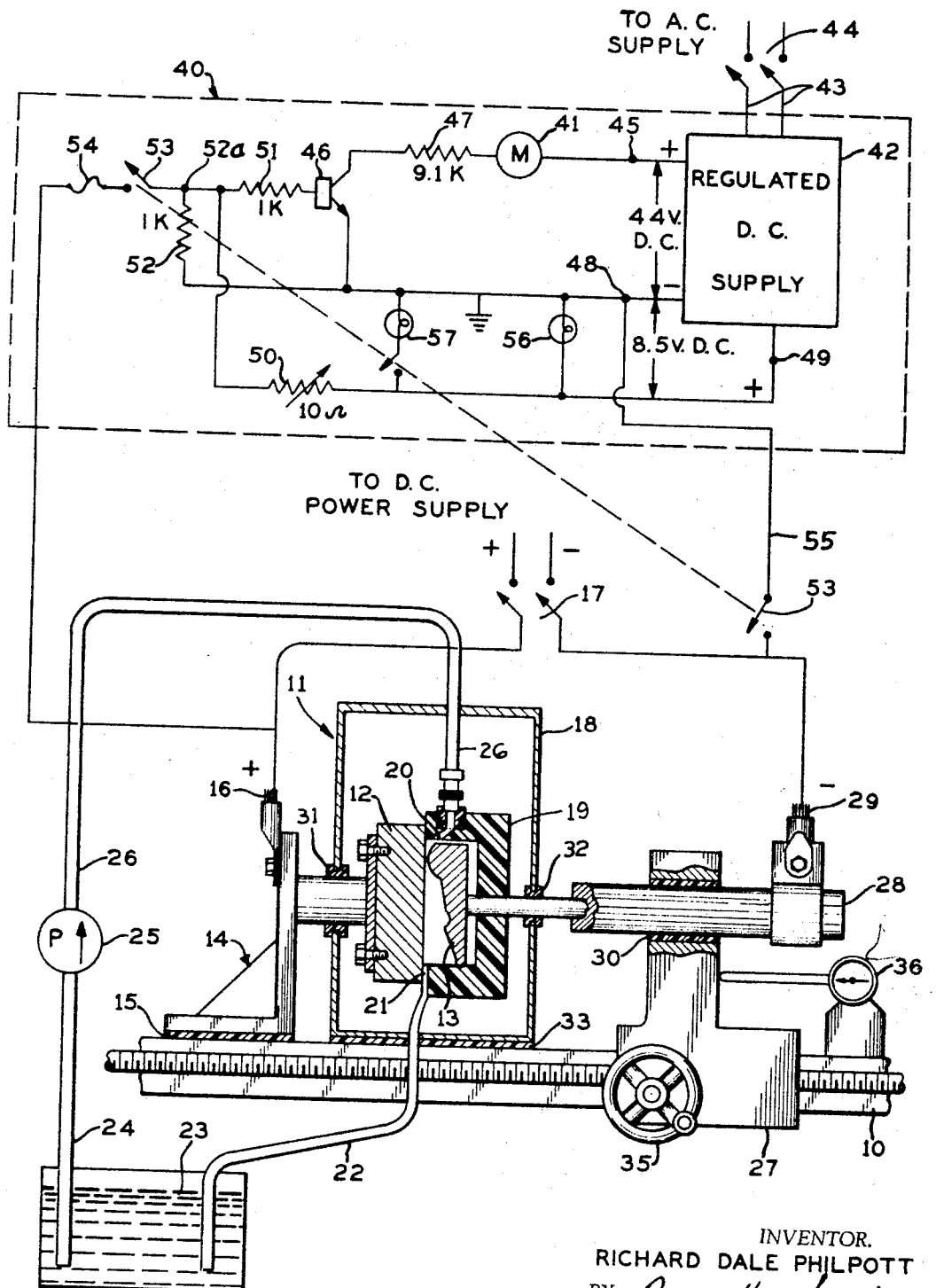

3,448,024
PROXIMITY DETECTOR FOR ELECTROCHEMICAL
MACHINING
Richard Dale Philpott, Cleveland Heights, Ohio, assignor to The Steel Improvement and Forge Company, Cleveland, Ohio, a corporation of Ohio
Filed Feb. 18, 1966, Ser. No. 528,498
Int. Cl. B23p 1/12
U.S. Cl. 204—143                  12 Claims

ABSTRACT OF THE DISCLOSURE

A proximity detector for use with electrochemical machining apparatus having a tool and workpiece adapted for relative movement toward and away from each other while jointly contacting an electrolyte, the detector being designed to indicate when a predetermined minimum spacing between the tool and workpiece is first reached without requiring contact between or among the tool, workpiece, or other attendant parts of the apparatus.

---

This invention relates to electrochemical machining and more particularly to a method and apparatus for measuring the minimum spacing between the electrode tool and the workpiece in electrochemical machining operations.

Electrochemical machining, in which material is removed from the workpiece solely by electrolytic dissolution without any contact between the tool and the workpiece, is used widely in manufacturing parts that are difficult to produce by conventional machining methods. Methods and apparatus for electrochemical machining are disclosed, for example, in the Faust et al. Patent No. 3,095,364 and in the Williams Patent No. 3,058,895. These methods require that the electrode tool be spaced close to the workpiece, but the tool should not touch the workpiece inasmuch as contact between the tool and the workpiece is apt to result in damage to one or both of these parts. In initiating electrochemical machining operations, it is customary to set the tool at a predetermined distance from the workpiece before turning on the electric current. Thereafter, the current is turned on and the tool is advanced toward the workpiece at a predetermined rate. It is desirable that the tool be positioned at the correct distance from the workpiece at the beginning of the operation. One known method employed to position the tool with respect to the workpiece is to connect the workpiece and tool in an electric circuit and advance the workpiece toward the tool until the workpiece touches the tool. The circuit is arranged to ring a bell or give some other signal when the workpiece touches the tool. The electric current is then turned off and the tool backed away from the workpiece to the desired clearance, a dial indicator being employed to determine the distance that the tool is backed away. This system is not satisfactory because even with the exercise of considerable care, damage to the tool or workpiece is apt to occur by bringing them together too forcibly. Also, this system requires the parts to be carefully dried before the setting is made because the presence of even a drop of electrolyte could result in the giving of a false signal. Furthermore, in the usual electrochemical machining operation, the electrolyte is at a somewhat elevated temperature and flows at high velocity and under substantial pressure through the gap between the work and the electrode tool. If the workpiece and tool are of substantial area, deflection of the machine, workpiece or tool may occur under pressure, and a setting of the tool with respect to the workpiece that is accurate with the parts at room temperature and dry and with no pressure in the gap will almost inevitably be inaccurate when the electrolyte is turned on and caused to flow through the gap at normal operating pressures and temperatures.

Accordingly, a general object of the present invention is to provide an improved proximity detector for electrochemical machining operations in which the proximity of the electrode to the workpiece can be measured with all conditions as they are during machining except that the electrolysis current is not caused to flow. Another object is to provide such a system in which an indication of proximity of the workpiece to the tool is given before the tool touches the workpiece so that the chance of damage to the tool or workpiece can be minimized. Another object is the provision of a method of setting the position of a workpiece with respect to a tool for electrochemical machining operations that is accurate and convenient and can be carried out with a minimum chance of damage to the tool or the workpiece.

To the accomplishment of the foregoing and related objects, then, this invention comprises the features hereinafter described and particularly pointed out in the claims, the following description and the drawing setting forth in detail one illustrative embodiment of the invention.

The drawing somewhat schematically illustrates a known electrochemical machining apparatus embodying a proximity detector made according to a preferred form of the present invention.

The electrochemical machining apparatus shown in the drawing is substantially the same as the apparatus shown in FIGURE 1 of the aforesaid Faust et al. Patent No. 3,095,364. A lathe bed 10 serves as the basic piece of equipment for an electrochemical machining apparatus 11. Any other suitable machine, such as a vertical drill press, which can provide or be modified to allow for cathode and anode support, controlled cathode and/or anode advance, electrolyte flow system and shield, current carrying, etc., can be utilized. The apparatus 11 is illustrated as providing a die cavity in the anode workpiece 12 through the controlled advance of a cathode tool 13 which has a shape substantially the same as the shape to be produced in the workpiece 12.

A typical electrochemical machining operation is carried out as follows: The workpiece 12, which is to receive the electroformed cavity, is attached to the anode support 14, which is electrically insulated from the lathe by insulation 15, and to which a connection from the anode lead 16 is made. Anode lead 16 is connected through a switch 17 to a source of D.C. that supplies the electrolysis current. The anode block 12 is positioned inside a spray box or splash hood 18. The contour and shape of the cathode tool 13 correspond substantially to the shape and contour of the desired cavity.

A clear, transparent, plastic guide box 19 is attached to the anode block 12. The guide box 19 has an inlet 20, through which electrolyte enters the space between the workpiece 12 and the tool 13, and an outlet 21, through which the electrolyte flows from between the workpiece and the tool into tube 22 which conveys the electrolyte to a reservoir 23 from which tubing 24, a pump 25 and tubing 26 supply the electrolyte under pressure to the inlet 20. The inlet 20 and the outlet 21 may be slotted, round, or any other convenient shape.

The lathe threading mechanism, acting through suitable conventional reduction gearing and the lathe carriage 27, advances the cathode tool 13 so as to maintain the desired spacing between the die block 12 and the tool 13. The cathode tool holder 28 receives current from the cathode lead 29 which is connected to the negative terminal of a direct voltage source, the positive terminal of which is connected to the anode bus bar 16. The tool holder 28 is insulated by insulation 30 from the lathe carriage 27. The spray box 18 may be made of insulating material or may be provided with insulation at 31 and 32 to insulate it from the workpiece 12 and the tool 13 and with insulation 33 to insulate it from the lathe bed 10.

The desired rate of advance of the cathode tool 13 is provided by utilizing a carriage advance setting that matches the electrolytic metal dissolution rate. The position of the cathode tool can also be adjusted manually by the hand wheel 35. A dial indicator 36, or similar device, that is adjustably mounted on lathe bed 10 is provided to aid in positioning the tool.

As described in the Faust, et al. Patent No. 3,095,364, electrochemical machining operations are frequently carried out with gaps of the order of .005 to .015 inch between the electrodes. The electrode pressures are substantial, being the range of from 20 to 100 or more pounds per square inch. The electrolyte flows rapidly between the electrodes, the speed being, for example, of the order of 80 feet per second and heavy current densities are employed. The electrolyte may be any convenient type known in the art and suitable for the material to be machined. All of these factors, as well as the machine described heretofore, are well known in the art.

The present invention provides an apparatus for measuring the minimum spacing between the electrode tool and the workpiece in electrochemical machining operations under essentially the same conditions as are encountered in service except that the electrolysis current is not turned on; from this minimum spacing, the initial gap spacing can be set with ease and a sufficient degree of accuracy. This is accomplished by a proximity detector indicated in general at 40 that includes an electronic network, preferably constructed as shown schematically in the drawing, that gives an indication when the resistance between the cathode tool 13 and the workpiece 12 is reduced to a predetermined value. This resistance decreases as the gap between the electrodes decreases. Therefore, when the predetermined value of resistance is reached, the operator knows that a predetermined spacing between the cathode and the workpiece has been reached.

The circuit is such that there is an immediate and substantial deflection of a meter 41, which may be a conventional milliammeter, when the resistance reaches the predetermined low value. The circuit comprises a regulated direct current power supply 42 that is connected through suitable conductors 43 and a switch 44 to an alternating current source. The positive terminal 45 of the D.C. supply is connected to the collector of a transistor 46 through a current-limiting resistor 47 and meter 41. The emitter of the transistor is connected to the negative terminal 48 of the regulated D.C. power supply which is connected to the negative lead 29 and thus to the cathode tool 13. The regulated D.C. supply 42 provides a closely regulated direct current potential across terminals 45 and 48. Preferably this potential is of the order of about 44 volts. With this circuit, the meter M indicates the collector current of the transistor whenever the transistor is conducting. This current is limited by the resistor 47 to a value at which the transistor can operate safely, for example, about 5 milliamperes. In the example given, the transistor conducts whenever the base voltage is in excess of about 0.64 volt and the meter then reads about 5 milliamperes. Whenever the base voltage falls below about 0.52 volt, the transistor becomes non-conducting and the meter drops to zero.

In order to supply the required base voltage to the transistor, the power supply is provided with a low voltage (preferably about 8.5 volts) positive output terminal 49 which is connected to the base of the transistor through a variable resistor 50, which is employed in the adjustment of the proximity detector, and a current-limiting resistor 51. A bias resistor 52 is connected between the base circuit and terminal 48. The voltage drop across bias resistor 52 is the emitter-base voltage.

The base of the transistor 46 is also connected through the resistor 51, a switch 53 and a suitable fuse 54 to the lead 16 that is connected to the anode workpiece 12. The circuit of the proximity detector is completed to terminal 48 of the regulated D.C. power supply through the electrolyte (not shown) that flows between the cathode 13 and the workpiece 12, the lead 29, conductor 55 and another pole of switch 53.

It will be noted that the circuit through the electrolyte is in parallel with the resistor 52. Thus, the base voltage of the transistor also depends upon the resistance of the circuit through the electrolyte in the gap between the workpiece and the cathode tool. The transistor is selected so that it will be particularly sensitive to changes in the base voltage that occur due to changes in electrolyte resistance as the gap between the tool and the workpiece is reduced to, for example, about 0.003 to 0.001 inch. With a 44 volt D.C. supply and an 8.5 volt D.C. bias voltage and with resistors having the values shown on the drawings a 2N699 transistor gives satisfactory results. Transistors of this type are fully conductive when the base voltage exceeds about 0.64 volt and become non-conductive when the base voltage is reduced to less than about 0.52 volt.

The circuit operates as follows: Assuming that variable resistor 50 is properly adjusted as described below, that the gap between electrode tool 13 and the workpiece 12 is greater than the predetermined amount, that the switches 44 and 53 are closed and the switch 17 open, the base voltage will be large enough to cause transistor 46 to conduct and the maximum current will flow through the meter 41, the resistor 47 and the collector and emitter of transistor 46; this current, in the example given, is limited by resistor 47 so that the meter will read about 5 milliamperes.

If the operator now slowly advances the cathode tool toward the workpiece 12, the resistance between point 52a of the base circuit of the transistor 46 and the terminal 48 is gradually reduced due to the reduction in thickness of the flowing electrolyte between the cathode tool and the workpiece. When this resistance is reduced to such an extent that the voltage appearing across the resistor 52 is reduced to a value insufficient to maintain the transistor 46 in the fully conducting state, the current flowing through the meter 41, the resistor 47 and the collector circuit of the transistor is immediately and sharply reduced. This occurs when the base bias voltage is reduced, in the example given, below about 0.64 volt and results in a sudden reduction in the meter reading which indicates to the operator that the resistance between the workpiece 12 and the cathode tool 13 has been reduced to the predetermined value and that the tool is in very close proximity to the workpiece. A meter reading of zero indicates that the tool and the workpiece are in contact or substantially so.

The apparatus preferably includes an indicator lamp 56 connected across the 8½ volt bias supply to indicate when the appartaus is turned on and another indicator lamp 57 that is connected through another pole of switch 53 so that the lamp 57 lights whenever the proximity detector is electrically connected to the tool and the workpiece.

When the proximity detector is first installed, the meter must be adjusted to compensate for the resistance in the leads from the detector to the eelctrodes. This compensation is provided for by the 10 ohm potentiometer 50. To make the initial adjustment, the proximity indicator is connected to the electrodes with the potentiometer set at zero. The electrodes must be clean; the electrolyte supply and the electrolysis current must both be turned off. The tool is then advanced toward the work until a sharp dip in the reading of the meter 41 occurs. This indicates that the tool and the workpiece are in contact. The potentiometer is then adjusted until the needle of the meter just reaches zero. In this condition, the resistance of the potentiometer balances the resistance of the leads, and when the electrolyte is flowing between the electrodes, a sharp dip of the meter needle will indicate that the tool is within a distance of, for example, 0.001 to 0.003 thousandths of an inch from the workpiece, while a meter reading of zero will indicate that the electrodes are in contact.

To summarize the operation, after the initial adjustment has been made, the workpiece 12 and tool 13 are positioned in the machining apparatus with the workpiece spaced from the tool by a distance that is greater than the gap width normally employed. The electrolyte is caused to flow between the electrode tool and the workpiece at the velocity, pressure and temperature that will be employed during the machining operation, but the electrolysis current is not turned on. Instead, the switch 17 is opened and the switches 44 and 53 are closed to turn on the proximity detector and connect it to the tool and the workpiece. The meter will then give an indication showing that a current of the order of 5 milliamperes is flowing through the transistor. This indicates that the resistance between the tool and the workpiece through the electrolyte is greater than the predetermined low value that obtains when the gap between the electrode and the tool is reduced to the desired low value. The operator then manually advances the tool slowly toward the workpiece, watching the meter as he does so. The transistor 46 continues to conduct at its full capacity even though the resistance of the circuit gradually becomes less as the gap decreases, until the resistance across the gap becomes so low that the base voltage on the transistor is reduced to a value such that the reading of the meter dips to substantially less than 5 milliamperes, indicating the close proximity of the tool to the workpiece. The operator then immediately stops advancing the tool and turns off the signal voltage. When such an indication is given by the meter, the operator knows that with an apparatus embodying the circuit specifically disclosed herein, the closest point of the tool is spaced a distance of from about 0.001 to 0.003 inch from the workpiece. The operator then notes the reading of the dial indicator 36. The dial indicator does not measure the gap directly, but does give an indication of the relative position of the electrodes which can be used as a basis for gap measurement for setting. The operator then backs the tool away from the work an amount sufficient to give the desired initial electrochemical machining gap. For example, if it is desired to employ an initial gap of about 0.015 inch, the operator will back the tool away from the work a distance of about 0.013 inch. The operator then can turn on the electrolysis current and the mechanism for automatically advancing the tool toward the work with the assurance that the initial gap setting was substantially correct.

If it should be desired to measure the operating gap between the electrode and the work after the electrolytic machining operation has been continued for some time, the operator turns off the electrolysis current, stops the advance of the work, turns on the proximity detector and throws the switch 53 to connect the proximity detector across the work and the tool, notes the reading of the dial indicator 36 to obtain an indication of the position of the tool with respect to the workpiece, and then uses the indicator to measure the distance that it is necessary to advance the tool toward the work before the proximity detector gives an indication. For example, if it is necessary to advance the tool toward the work a distance of 0.019 inch before the proximity indicator gives an indication, then it can be assumed that the gap at its narrowest point had a width of from 0.020 to 0.022 thousandths of an inch. If further accuracy is desired, the tool can be advanced toward the work until the meter gives a zero reading, indicating that the tool and the work are touching. It is preferred not to do this, however, because of the possibility of damage to the tool or workpiece unless care is exercised. In either event, the operator then can back away the tool from the work to the desired distance as indicated by the dial indicator, make any adjustments in the apparatus that may be necessary to correct any error in the gap and resume the electrochemical machining operation, all with little delay.

It will be noted that although the variation in minimum gap distance at which the indication is given by the meter 41 may seem to be large when considered as a percentage of that distance, the variation (±0.001 inch in the example given) is not large as compared to the operating gaps often employed in electrochemical machining, which frequently are of the order of 0.010 to 0.015 inch or more.

Those skilled in the art will appreciate that various changes and modifications can be made in the preferred form of the invention disclosed herein. The essential characteristics of the invention are set forth in the claims.

I claim:

1. In electrochemical machining apparatus having a tool and workpiece adapted for relative movement toward and away from each other while in contact with an electrolyte, a proximity detector designed to indicate when a predetermined minimum spacing between the relatively movable tool and workpiece is first reached without requiring contact between or among the workpiece, tool, or attendant parts of such apparatus, said detector comprising:
   (a) a D.C. circuit having a positive terminal connected to the workpiece, and a negative terminal connected to the tool,
   (b) means in the circuit for applying a voltage across the tool through the electrolyte and to the workpiece,
   (c) signal means in the circuit responsive to the resistance between the tool and the workpiece in the absence of electrolyzing current to such apparatus to indicate when said resistance reaches a predetermined low value which corresponds substantially to that of said predetermined minimum spacing and which is in excess of the resistance between the tool and workpiece when in actual contact with each other.

2. The apparatus of claim 1 wherein said signal means includes electrically-responsive switching means.

3. The apparatus of claim 1 wherein said signal means comprises a transistor and meter serially connected with respect to each other and with respect to said electrolyte, and further including base voltage biasing means for the transistor connected in parallel with the electrolyte and effective to render the transistor conducting as indicated by the meter whenever the base voltage is above a predetermined voltage value, and to render the transistor non-conducting as indicated by the meter whenever the base voltage is below a predetermined voltage value, said base voltage biasing means in the absence of electrolyzing current to said apparatus being correspondingly responsive to the electrical resistance between the tool and the workpiece through the electrolyte, a relatively high resistance providing a base voltage above said predetermined voltage value, and a progressively lower resistance providing a progressively lower base voltage, until substantially the lowest gap resistance is reached afforded by said predetermined minimum spacing to render the transistor non-conducting and thereby signal that the minimum spacing has been reached.

4. The apparatus of claim 1 wherein said signal means includes a milliammeter, the circuit having a current limiting resistance in series with the milliammeter, whereby the reading of such meter remains substantially constant at all values of resistance through the electrolyte between the tool and workpiece that are above said predetermined low value.

5. The apparatus of claim 1 wherein said signal means includes a meter and said circuit has a variable resistor to balance the resistance of leads to the workpiece and tool and thus adjust the meter to provide a zero reading when the workpiece is in contact with the tool in the absence of any electrolyzing current to said apparatus, thereby to compensate the circuit for the resistance of such leads.

6. The apparatus of claim 1 wherein said circuit has a regulated D.C. supply for furnishing a signal voltage, said signal means includes a transistor having a collector-emitter circuit connected across terminals of said D.C. supply and a milliammeter for indicating the collector-emitter current of said transistor, and further including a current-limiting resistor connected in series in said collector-emitter circuit, base voltage biasing means for said transistor having a bias resistor, and leads for connecting the tool and workpiece across the bias resistor, whereby the electrolyte in the gap between the tool and workpiece is in parallel with said bias resistor.

7. In the process of positioning at a predetermined minimum spacing a relatively movable tool and workpiece of electrochemical machining apparatus without requiring contact between or among the tool, workpiece, or attendant parts of the apparatus, the improvements comprising:
(a) spacing apart the tool and workpiece at a distance greater than the minimum spacing,
(b) contacting the tool and workpiece with an electrolyte in the absence of electrolyzing current to such apparatus,
(c) applying a D.C. voltage from the tool through the electrolyte to the workpiece,
(d) advancing the tool and workpiece relatively toward one another,
(e) electrically sensing the decreasing resistance between the tool and workpiece as they approach one another, and
(f) actuating a signal in the circuit when a predetermined low resistance is reached which corresponds substantially to that of said predetermined minimum spacing and which is in excess of the resistance between the tool and workpiece when in actual contact with each other.

8. The process of claim 7 wherein such electrically sensing of the decreasing resistance between the tool and workpiece is effected by a transistor and meter serially connected with respect to each other and with respect to the electrolyte, and further including the steps of impressing a biasing base voltage on the transistor in parallel with the electrolyte, said base voltage being correspondingly responsive to the electrical resistance between the tool and the workpiece through the electrolyte and effective to render the transistor conducting as indicated by the meter whenever the base voltage is above a predetermined voltage value, and to render the transistor non-conducting as indicated by the meter whenever the base voltage is below a predetermined voltage value, and interrupting such advance of the tool and workpiece when the electrical resistance therebetween is sufficiently low to render the transistor substantially non-conducting, thereby indicating that the minimum spacing has been reached.

9. The process of claim 8 wherein said meter is a milliammeter, and further including limiting the current to the milliammeter by a resistance, whereby the reading of the milliammeter remains substantially constant at all values of resistance through the electrolyte in the spacing between the tool and workpiece that are above said predetermined low resistance.

10. The process of claim 7 wherein the electrolyte is passed between the tool and workpiece at substantially the same pressure and velocity as used during electrolysis by such apparatus.

11. The process of claim 7 wherein said predetermined minimum spacing is about 0.001 inch to about 0.003 inch.

12. The process of claim 7 further including the steps of measuring the position of the tool with respect to the workpiece after the minimum spacing has been reached by measuring means disposed externally of such spacing to obtain a first reading, moving the tool and workpiece apart to a first setting, interrupting the energized D.C' circuit and supplying electrolyzing current to such apparatus while relatively advancing the tool and workpiece together, subsequently interrupting the electrolyzing current and again positioning the tool and workpiece at a minimum spacing in accordance with the process of claim 7, again measuring the position of the tool with respect to the workpiece by said measuring means to obtain a second reading, then moving the tool and workpiece apart to a second setting, said first and second settings being a distance apart that is substantially equal to the difference between the first and second readings, the second setting being closer to the workpiece than the first setting, and finally again interrupting the energized D.C. circuit and resuming the supply of electrolyzing current to said apparatus.

References Cited

UNITED STATES PATENTS

| | | | |
|---|---|---|---|
| 3,215,996 | 11/1965 | Schwartz | 340—256 |
| 3,242,473 | 3/1966 | Shivers et al. | 340—235 |
| 3,247,599 | 4/1966 | O'Connor | 219—69 |
| 3,281,343 | 10/1966 | O'Conner | 204—143 |
| 3,288,693 | 11/1966 | Livshits | 204—143 |
| 3,372,099 | 3/1968 | Clifford | 204—143 |

ROBERT K. MIHALEK, *Primary Examiner.*

U.S. Cl. X.R.

204—224, 225, 228; 340—256, 235